Dec. 17, 1940.    J. K. WOOD    2,225,515
SUPPORT DEVICE
Filed Dec. 10, 1938
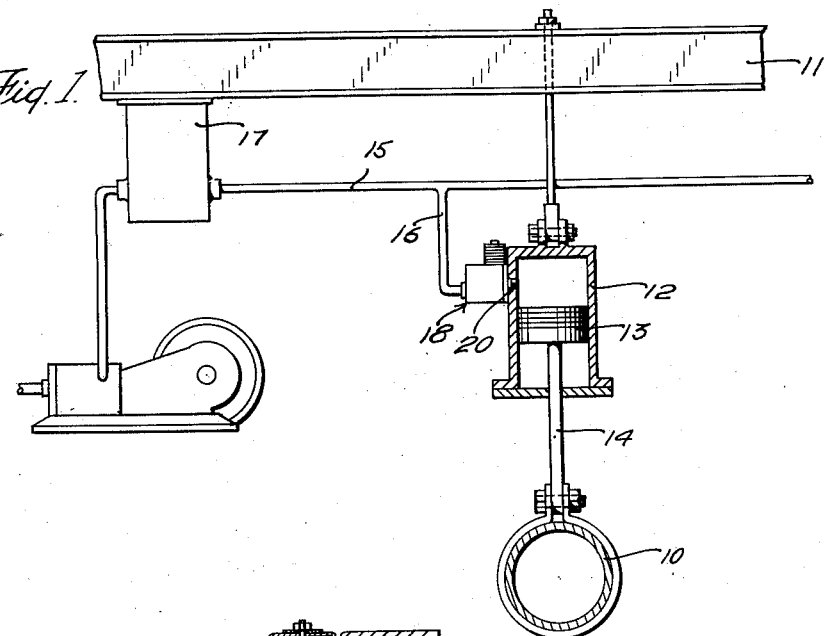
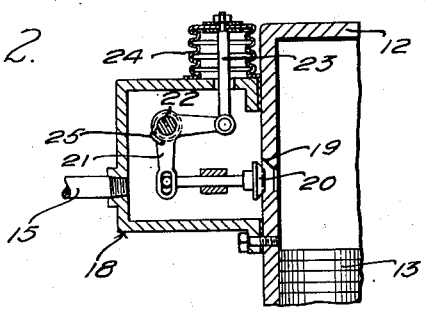
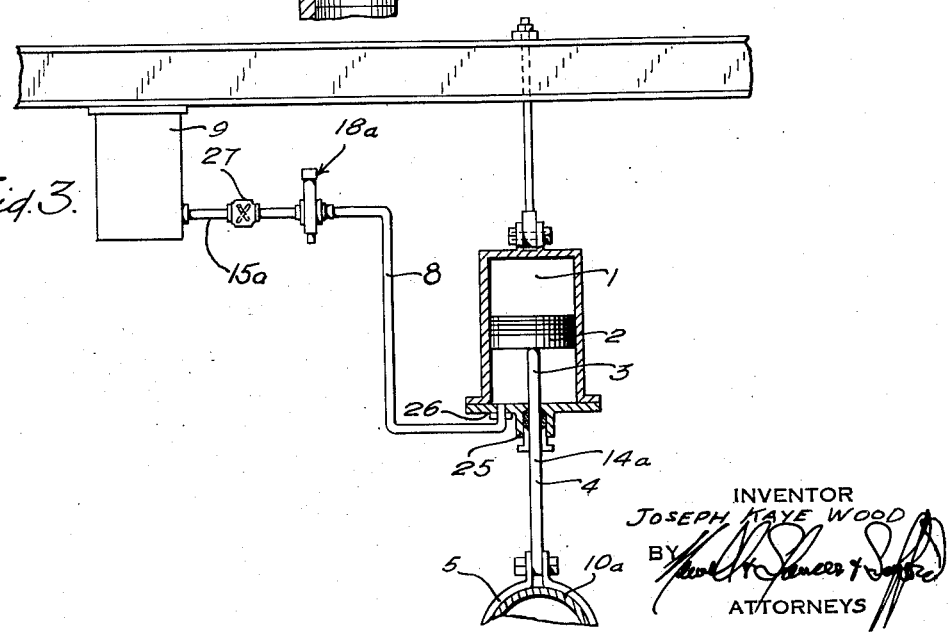
INVENTOR
JOSEPH KAYE WOOD
BY
ATTORNEYS

UNITED STATES PATENT OFFICE 2,225,515

SUPPORT DEVICE

Joseph Kaye Wood, Bronx, N. Y., assignor to General Spring Corporation, New York, N. Y., a corporation of New York Application December 10, 1938, Serial No. 244,926

5 Claims. (Cl. 267—1)

This invention relates to supporting devices and more particularly to devices adapted to provide constant supporting force throughout its substantial vertical range in which the supported load is freely movable.

In a copending application, Serial No. 231,303, filed September 23, 1938, I have described a motor device for supporting a load in which the motive power is controlled in response to the force exerted by the load. I have now found that in certain cases it is possible and desirable to eliminate the force responsive control means and it is an object of the present invention to provide a device in which the load is supported by a constant force regardless of the position of its movement and without necessity for force responsive adjusting devices.

According to my present invention the supporting device is a fluid pressure motor means but instead of controlling the motive power by means of a force responsive valve the motor is connected at all times through an open connection with a source of constant fluid pressure. From this construction it will follow necessarily that the force exerted by the motor will necessarily be the same within the entire scope of operation of the motor and regardless of the position to which it has been operated. The magnitude of the force exerted upon the load will, of course, depend upon the pressure differential exerted in the motor and the area of the piston or other surface exposed to the pressure differential.

The pressure will ordinarily be compressed air or vacuum, since that is almost always readily obtainable, but other fluids, both gas and liquid may be used.

In a preferred embodiment of my invention a pipe line or other device to be supported would be connected at a number of spaced points by similar fluid pressure supporting motors and each of these will be connected to a common pressure line, the pressure of which is controlled and kept constant at a single point under the supervision of automatic pressure controls. In order to take care of different parts of the apparatus that may weigh differently, motors of different sizes may be provided which will, in consequence of their difference in size, exert correspondingly different forces in support of their respective loads. Ordinarily, however, a very few standard sizes will suffice, since these may be combined, several being used to support a given piece of apparatus and being distributed so that various parts of the apparatus are independently supported and no part will be subjected to unsupported stresses greater than its design principles.

The one important danger in this type of apparatus is the possibility of failure of the pressure source which, because of the open connection between the pressure line and the motor device would permit the support to cease as soon as the pressure ceases to be maintained. This danger I have avoided in my preferred embodiment by the use of a balanced pressure responsive valve in the connection between the fluid motor support and the pressure line. This valve being responsive to an exact pressure differential between that inside the line and the pressure of the atmosphere allows the connecting force between the fluid motor and the pressure line to remain open so long as the exact balance is maintained; but, as soon as the pressure deviates materially from that which should be maintained in the line, the port is closed by the automatic valve and remains closed until the proper pressure is restored. During the time that this port is closed the motor device will, of course, be inoperative to follow movements of the supported device with accurately maintained pressure and any leakage which may occur at the valve or otherwise in the motor device may gradually decrease the support of the load; but the fluid pressure remaining in the cylinder affords a resilient support which can yield to accommodate such movements as may occur. Such a change in pressure may, at the same time that it closes the port, actuate an alarm, so that, if the pressure could not be restored promptly the supported apparatus might be shut down before any serious leakage from the supporting pressure motor device resulting in the loss of support for the load, could occur. In order that the line may be adequately supported when cool without pressure in the line, each of the motors would be designed so as to reach, when the pressure is released, a rigid support corresponding with the cold position of the pipe or the inoperative position of such other load as may be concerned.

In the accompanying drawing I have shown a preferred embodiment of my invention and in this specification I have described the invention and the preferred embodiment and various modifications thereof in some detail. It is to be understood, however, that these are not intended to be exhaustive or limiting of the invention, but on the contrary are chosen and set forth for the purposes illustrating the invention and instructing others in the principles thereof and in the best manner of applying and using the same in practice so that others may be able to modify and adapt the invention and embody it in numerous forms each as may be best suited to the circumstances of a particular use.

In the drawing:

Fig. 1 shows a diagrammatic view partly in section of one form of my invention using vacuum for activation;

Fig. 2 shows in section on an enlarged scale, a special pressure control valve which may be particularly useful with my invention;

Fig. 3 shows a diagrammatic view of another form of my invention in which a compressed fluid is used as the activating means.

Referring first to Fig. 1, I have there shown a device designed for use of vacuum, although the same principles are applicable with super atmospheric pressure, as will be evident to those skilled in the art.

The pipe line 10 is to be supported from a girder or other anchoring device 11. The support is effected by means of the fluid pressure cylinder 12 shown in section in this figure to expose the piston 13 connected to the pipe by means of the rod 14. The interior of the cylinder is connected to a pressure pipe line 15 by means of the branch pipe 16. The pipe line 15 is in turn connected to a reservoir 17 in which a constant pressure is maintained by a vacuum pump and suitable automatic pressure controls, not shown. In order to hold the pressure in the supporting cylinder 12 notwithstanding any possible failure of the pressure line 15, a valve 18 is provided in the branch connection 16.

This valve is shown in detail in Fig. 2. As there shown, a relatively small connection 19 is provided from the branch pipe 16 into the cylinder 12 and over the ends of this is positioned a poppet valve 20 connected in turn to a bell crank lever 21 pivoted at 22. The opposite end of this bell crank lever is connected through a link 23 to the bellows 24. A spring, e. g., as shown at 25 or at any other suitable location, serves to urge the valve into a closed position but its force is balanced in normal operation by the pressure differential on the bellows 23. As soon as this balance is destroyed by a change of the pressure in the line the valve 20 moves into the closed position over the port 19 and thus prevents any further loss of pressure from the fluid-pressure motor device.

In Fig. 3 is shown another embodiment of the invention. The cylinder 1 is fitted with a piston 2 which is connected through the piston rod 14a to the support 5 which supports the load 10a. The piston rod 14a passes through a packing 25 in the end wall of the cylinder. The same end of the cylinder is also fitted with one or more ports 26 connected to the pressure line 8. The pressure line 8 is either connected to the main reservoir 9 directly or, as shown in the figure, connected through the reducing valve 18a and back check 27 to the main reservoir pipe 15a. It is desirable to use an adjustable pressure reducing valve rather than a direct connection to the main air supply, since by adjusting the pressure at the reducing valve any load within the limit of the device and of the fluid pressure supply may be supported, and the same size cylinder may be used for a wide variation of load, reducing the number of cylinder sizes necessary to cover a complete range of loads.

The valve 18a is designed so as to maintain a constant pressure on the cylinder, and reduces the pressure by venting to the atmospheric if the cylinder pressure becomes too high, or increases the pressure by connecting the supply pressure line to the cylinder if the pressure becomes too low. The back check 27 is located between the pressure source and the regulating valve, and prevents loss of pressure from the cylinder into the pressure supply line if the pressure of this line should, for any reason, fail.

The operation of this device can be best understood by referring to the figure. The load in this figure, shown as a pipe line 10a, may move through a considerable distance due to expansion and contraction. A substantially constant supporting force must be applied to the pipe in order to prevent damage to the fittings and members to which the piping is attached. When the piping moves upward or downward the piston 2 follows it, and fluid at substantially constant pressure enters or leaves the cylinder 1. Because of the reducing and relief valve 18a the pressure is maintained constant in the cylinder no matter the volume of liquid, and since the sustaining force is equal to pressure times cylinder area, it remains a constant irrespective of the position of the pipe. If the pipe tends to expand upward it will decrease the force that the piston must exert to maintain it in its original position, leaving a resultant force on the cylinder upward, and causing the piston to move upward until equilibrium is reached again in a higher position. If the pipe tends to move downward the total force will exceed that of pressure times area and the piston will move downward until equilibrium occurs. In this manner a constant sustaining force is maintained on the pipe irrespective of position. It is obvious that any fluid may be used, such as oil, water, compressed air, etc., and that the piston may be directly connected to the load, or it may be connected to the load through a lever or other indirect means as through gearing or linkage.

It is to be understood, of course, that the supporting device as shown and described here may be used not only above the pipe line, as illustrated in the figures, but either below the pipe line or to one side of it. If placed to one side, a leverage system may be advantageously used to convey the forces from the piston to the pipe line.

What I claim is:

1. A device for supporting a vertically movable object with a substantially constant supporting force, comprising a cylinder, a piston fitted in said cylinder, a connecting link between the piston and the object to be supported, means for maintaining the space back of the piston in substantially air tight relation to the atmosphere, and means for maintaining substantially constant fluid pressure in the space back of the piston irrespective of its position, whereby to maintain constant supporting force on the object.

2. In a device for supporting a thermally expansible high temperature apparatus with constant sustaining force, a vertical cylinder, a piston in said cylinder connected to the load, and valve means responsive to the pressure in said cylinder adapted to control admission of fluid pressure from a supply source, and relief of pressure from the cylinder, whereby to maintain constant pressure in the cylinder, and, therefore, constant sustaining force on the load.

3. A device for maintaining a constant supporting force on an object while allowing it free movement having in combination anchoring means, means for engaging the object and intermediate means comprising a cylinder and a piston, a chamber in the cylinder bounded on one side by the piston being in substantially air-tight relation to the atmosphere, said piston and cylinder being connected one with the means engaging the object and the other with the anchoring means, means for connecting said air-tight chamber with a source of constant pressure.

4. A device as defined in claim 3 in which the source of constant fluid pressure comprises a reducing valve, connected to a feed line having a substantially higher fluid pressure than that used in the cylinder.

5. In a high temperature apparatus having a portion thereof vertically movable by thermal expansion and contraction, a supporting device for maintaining a constant sustaining force on the supported movable portion, comprising an anchoring means, means engaging the movable portion, and an intermediate connecting means which comprises a fluid pressure motor device, and means for supplying constant fluid pressure thereto, whereby to maintain a constant force between the anchoring means and supported movable portion.

JOSEPH KAYE WOOD.